(12) United States Patent
Choi et al.

(10) Patent No.: US 8,777,524 B2
(45) Date of Patent: Jul. 15, 2014

(54) CUTTING INSERT

(75) Inventors: Chang Hee Choi, Daegu (KR); Chang Gyu Park, Daegu (KR); Sung Pil Choi, Daegu (KR)

(73) Assignee: TaeguTec Ltd., Daegu (KR)

( * ) Notice: Subject to any disclaimer, the term of this patent is extended or adjusted under 35 U.S.C. 154(b) by 283 days.

(21) Appl. No.: 13/322,724

(22) PCT Filed: Jun. 26, 2009

(86) PCT No.: PCT/KR2009/003477
§ 371 (c)(1),
(2), (4) Date: Nov. 28, 2011

(87) PCT Pub. No.: WO2010/137762
PCT Pub. Date: Dec. 2, 2010

(65) Prior Publication Data
US 2012/0070242 A1    Mar. 22, 2012

(30) Foreign Application Priority Data

May 29, 2009  (FR) .......................... 10-2009-0047756

(51) Int. Cl.
*B23C 5/20*    (2006.01)
*B23C 5/10*    (2006.01)

(52) U.S. Cl.
CPC .................. *B23C 5/109* (2013.01); *B23C 5/202* (2013.01); *B23C 2210/0442* (2013.01); *B23C 2200/203* (2013.01); *B23C 2200/0477* (2013.01); *B23C 2200/208* (2013.01); *B23C 2210/045* (2013.01)
USPC ................................ 407/42; 407/61; 407/113

(58) Field of Classification Search
USPC ...................... 407/42, 61, 113, 114
See application file for complete search history.

(56) References Cited

U.S. PATENT DOCUMENTS 5,052,863 A * 10/1991 Satran .......................... 407/113
5,332,338 A    7/1994 Satran et al.
(Continued)

FOREIGN PATENT DOCUMENTS

JP       62-7318 U      1/1987
JP       7-246505       9/1995
(Continued)

OTHER PUBLICATIONS

International Search Report in PCT/KR2009/003477, dated Jun. 18, 2010.

(Continued)

*Primary Examiner* — Andrea Wellington
*Assistant Examiner* — Alan Snyder
(74) *Attorney, Agent, or Firm* — Womble Carlyle (57) ABSTRACT

A cutting insert has a top surface, a bottom surface, a plurality of side surfaces that connect the top and bottom surfaces. The side surfaces form an obtuse angle with the bottom surface as well as an acute angle with the top surface. The side surfaces include a first side surface and a second side surface, which form an obtuse angle with each other when seen from the above. A main cutting edge is formed at an intersection between the first side surface and the top surface. An inclined cutting edge, which is only for ramp milling, and a minor cutting edge are formed at an intersection between the second side surface and the top surface. An obtuse angle, which the second side surface forms with the bottom surface, is greater than that which the first side surface forms with the bottom surface.

23 Claims, 11 Drawing Sheets

(56) References Cited

U.S. PATENT DOCUMENTS

| | | | |
|---|---|---|---|
| 5,486,073 A * | 1/1996 | Satran et al. | 407/113 |
| 5,597,271 A | 1/1997 | Men et al. | |
| 5,807,031 A | 9/1998 | Arai et al. | |
| 6,050,752 A * | 4/2000 | DeRoche | 407/114 |
| 6,142,716 A * | 11/2000 | Jordberg et al. | 407/114 |
| 7,261,497 B2 * | 8/2007 | Maeda | 407/113 |
| 7,488,143 B2 | 2/2009 | Murén et al. | |
| 2007/0071559 A1 | 3/2007 | Koskinen | |
| 2008/0232912 A1 | 9/2008 | Bhagath | |
| 2008/0304924 A1 | 12/2008 | Engstrom et al. | |

FOREIGN PATENT DOCUMENTS

| | | |
|---|---|---|
| JP | 2001-009628 | 1/2001 |
| JP | 2002-178210 | 6/2002 |
| JP | 2009-061572 | 3/2009 |
| WO | WO 96/12583 A1 | 5/1996 |

OTHER PUBLICATIONS

Written Opinion in PCT/KR2009/003477, dated Jun. 18, 2010.
Official Action dated Mar. 28, 2013 issued in Chinese counterpart application (No. 200980159570.2) with translation.
Search Report dated Mar. 28, 2013 issued in Chinese counterpart application (No. 200980159570.2).
Official Action dated Mar. 29, 2013 issued in Japanese counterpart application (No. 2012-511740).
Notice of Allowance dated Apr. 19, 2013 issued in Russian counterpart application (No. 2011154158) with translation.

* cited by examiner

CUTTING INSERT

RELATED APPLICATIONS

This is a 35 USC 371 U.S. National Phase of International Application No. PCT/KR2010/003477, filed 26 Jun. 2009 and published in English as WO 2010/137762 A2 on 2 Dec. 2010, which claims priority to KR 10-2009-0047756, filed 29 May 2009. The contents of the aforementioned applications are incorporated by reference in their entirety.

TECHNICAL FIELD

The present invention relates to a cutting insert used for a cutting tool such as a milling cutter.

BACKGROUND ART

A cutting tool used for a metal machining process (e.g., milling) generally comprises a tool body and a plurality of cutting inserts mounted thereto. A cutting insert is either directly mounted to a tool body or indirectly connected to the same using a cartridge. The cutting insert comprises cutting edges that contact a workpiece so as to cut it during a cutting process.

Cutting inserts having a top surface, a bottom surface and side surfaces connecting the top and bottom surfaces have been known. The side surfaces form an obtuse angle with the bottom surface as well as an acute angle with the top surface. The cutting inserts have cutting edges formed at an intersection between the top surface and the side surfaces. The cutting inserts are one-sided with cutting edges provided only on its top surface. They are advantageous in terms of preventing interference between a side surface of the cutting insert and a machined surface during milling, and provide a sharp cutting edge.

Figure 1:
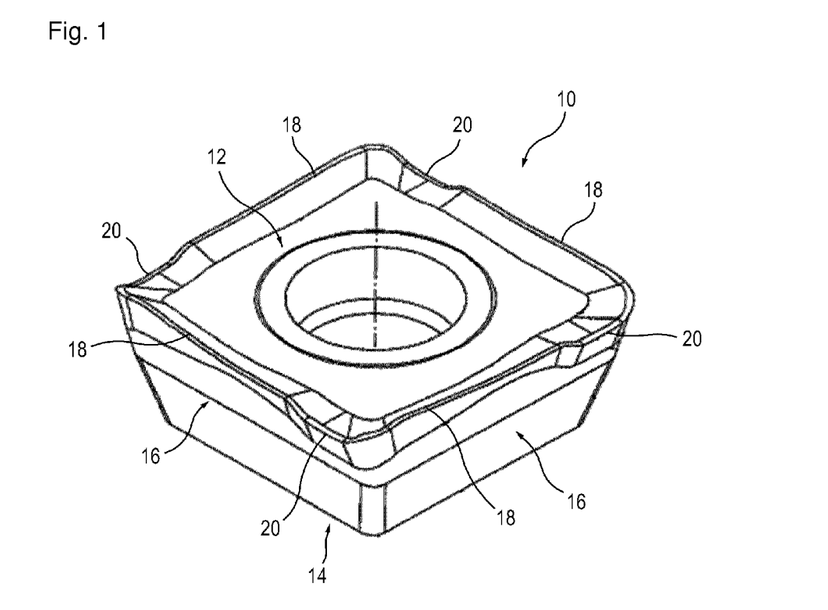
FIG. 1 is a perspective view of a prior art cutting insert.
Figure 2:
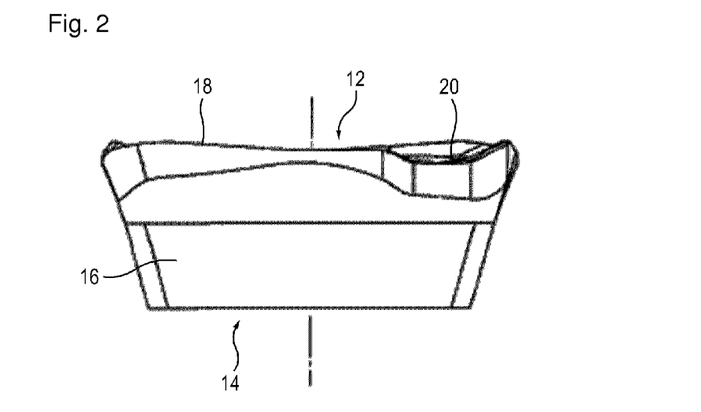
FIG. 2 is a side view of the cutting insert of FIG. 1.

Korean Patent Publication No. 10-2008-0107315 discloses such a prior cutting insert, which is shown in FIGS. 1-5. As shown in FIGS. 1 and 2, a cutting insert (10) comprises a top surface (12), a bottom surface (14) and side surfaces (16) connecting the top surface (12) and the bottom surface (14). The side surfaces (16) form an obtuse angle with the bottom surface (14) as well as an acute angle with the top surface (12). Four main cutting edges (18) and four minor cutting edges (20) are formed at an intersection between the top surface (12) and the side surfaces (16). The cutting insert (10) is mounted such that the main cutting edge (18) has a positive axial rake angle as well as a negative radial rake angle.

Figure 3:
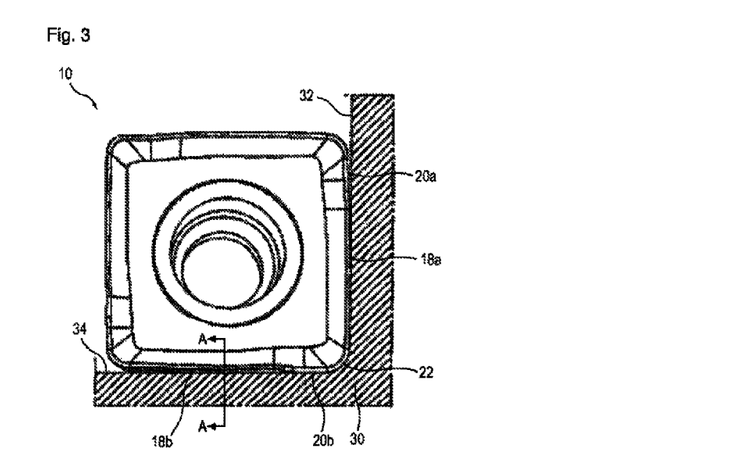
FIG. 3 is a front view of the cutting insert of FIG. 2 while cutting the upright wall and the base wall of the workpiece.

As shown in FIG. 3, when the cutting insert (10) is mounted in the cutting tool, a upright wall (32) is milled by the perpendicularly disposed main cutting edge (18a). Further, the surface of a base wall (34) is smoothened by the transversely disposed minor cutting edge (20b). As shown in FIG. 2, the minor cutting edge (20) is located closer to the bottom surface (14) of the cutting insert than the main cutting edge (18). Since the side surface (16) forms an obtuse angle with the bottom surface (14), the minor cutting edge (20) situated lower than the main cutting edge (18) is inwardly disposed with respect to the extension of the main cutting edge (18) when the cutting insert (10) is viewed from the above. Accordingly, the minor cutting edge (20a) disposed in the extension of the main cutting edge (18a) is spaced from the upright wall (32), while the main cutting edge (18b) disposed in the extension of the minor cutting edge (20b) is spaced from the base wall (34) and is not involved in cutting. However, it is difficult to form a large positional difference between the cutting edge (18a, 20b) involved in cutting and the cutting edge (18b, 20a), which is not involved in cutting, only by positioning the minor cutting edge (20) to be lower than the main cutting edge (18). Thus, it is difficult to prevent the cutting edge (18b, 20a), which is not involved in cutting, to not contact with the machined surface (34, 32).

Further, since a corner portion (22) of the cutting insert (10) first contacts a workpiece (30) to start cutting during milling, the greatest cutting resistance is generated in the corner portion (22) and the starting portions of the minor cutting edge (20b) and the main cutting edge (18a) connected via the corner portion (22). However, the minor cutting edge (20) is situated lower than the main cutting edge (18) in the prior cutting insert (10). Thus, the cutting insert (10) is thin in the corner portion (22) and the minor cutting edge (20), and does not provide a strength sufficient enough to correspond to a large cutting resistance.

Figure 4:
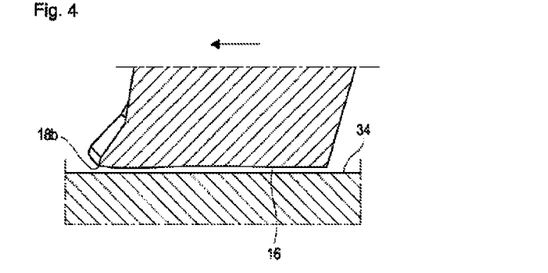
FIG. 4 is a sectional view taken along the line A-A shown in FIG. 3.
Figure 5:
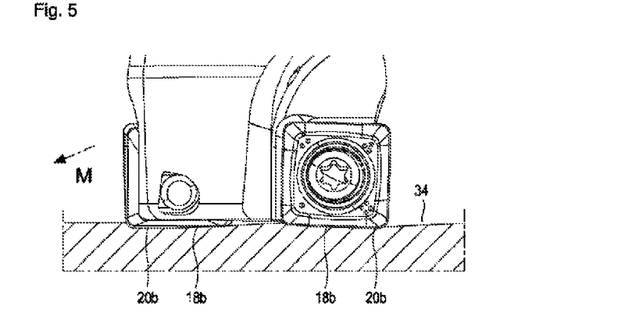
FIG. 5 is a schematic diagram of a prior art cutting insert configured to cut the workpiece while moving downwardly and obliquely.

Moreover, FIG. 5 shows that the cutting insert (10) cuts the work piece (30) while it simultaneously moves in the radial and axial directions in relation to the rotational axis of the cutting tool. The direction of motion is indicated by the arrow labeled M. As shown in FIG. 5, the main cutting edge (18 b) also contacts and cuts the base wall (34) during ramp milling. However, the main cutting process is performed by the main cutting edge (18 b). A great cutting resistance is applied to the main cutting edge (18 b). To not weaken the strength of the main cutting edge (18 b), the side surface (16) below the main cutting edge is designed to have a small clearance angle. Accordingly, as shown in FIG. 4, the side surface (16) is almost parallel to or situated nearest to the base wall (34) during the cutting process. When the main cutting edge (18 b) is used in ramp milling, the interference easily occurs between the side surface (16) below the main cutting edge (18 b) and the base wall (34). Thus, it is difficult to perform ramp milling to cut the work piece (30) by moving the prior cutting insert (10) downward and obliquely.

SUMMARY

The objective of the present invention is to solve the above problems of the prior art. The present invention provides a cutting insert that sufficiently prevents an interference between a machined surface and a cutting edge, which is not involved in cutting, while improving the strength of the corner portion where the greatest cutting resistance is generated during the cutting process. Further, the present invention provides a cutting insert that easily performs a ramp milling in which the cutting insert is moved in the radial and axial directions at the same time, as well as a face milling in which the cutting insert is moved radially in relation to the rotational axis of the cutting tool.

In order to achieve the above objective, the present invention provides a cutting insert comprising a top surface, a bottom surface, a plurality of side surfaces that connect the top and bottom surfaces and form an obtuse angle with the bottom surface as well as an acute angle with the top surface. The side surfaces comprise a first side surface and a second side surface, which form an obtuse angle with each other when seen from the above. A main cutting edge is formed at an intersection between the first side surface and the top surface. An inclined cutting edge, which is only for ramp milling, and a minor cutting edge are formed at an intersection between the second side surface and the top surface. An obtuse angle, which the second side surface forms with the bottom surface, is greater than that which the first side surface forms with the bottom surface.

According to one embodiment of the present invention, the main cutting edge slopes downward from a corner of the top surface. The inclined cutting edge slopes upward from a meeting point with the main cutting edge to a meeting point with the minor cutting edge. The minor cutting edge slopes from a meeting point with the inclined cutting edge to another corner of the top surface. An angle which the minor cutting edge slopes with respect to the bottom surface is smaller than that which the inclined cutting edge slopes with respect to the bottom surface.

An angle which the first side surface forms with the bottom surface increases along the main cutting edge from the corner of the top surface to a meeting point with the inclined cutting edge. Alternatively, the first side surface comprises a first curved surface which intersects the main cutting edge and a second plane surface below the first curved surface. An angle which the first curved surface forms with the bottom surface increases along the main cutting edge from the corner of the top surface to a meeting point with the inclined cutting edge.

The top and bottom surfaces are formed in a triangle. When seen from the above, adjacent side surfaces form a right angle with each other via a corner surface.

According to another embodiment of the present invention, the second side surface comprises a first plane surface and a second plane surface, which form an obtuse angle with each other when seen from the above. The inclined cutting edge is formed at an intersection between the first plane surface and the top surface. The minor cutting edge is formed at an intersection between the second plane surface and the top surface. The main cutting edge slopes downward from a corner of the top surface. The inclined cutting edge slopes upward from a meeting point with the main cutting edge to a meeting point with the minor cutting edge.

According to another embodiment of the present invention, the top and bottom surfaces are formed in a rectangle. When seen from the above, adjacent side surfaces form an obtuse angle with each other via a corner surface.

The cutting insert of the present invention can sufficiently prevent an interference between a machined surface and a cutting edge, which is not involved in cutting, while improving the strength of the corner portion where the greatest cutting resistance is generated during the cutting process. Further, the cutting insert can easily perform a ramp milling in which the cutting insert is moved in the radial and axial directions at the same time, as well as a face milling in which the cutting insert is moved radially in relation to the rotational axis of the cutting tool.

DETAILED DESCRIPTION

The cutting inserts according to the present invention are described below in detail with reference to the accompanying drawings.

Figure 6:
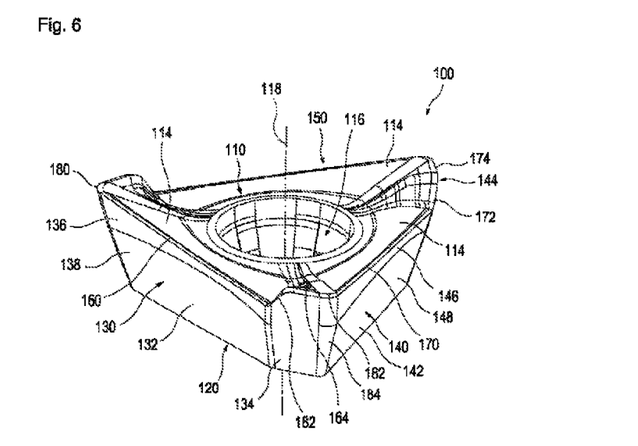
FIG. 6 is a perspective view of a cutting insert according to a first embodiment of the present invention.

FIG. 6 is a perspective view of a cutting insert according to the first embodiment of the present invention. As shown in FIG. 6, the cutting insert (100) includes a top surface (110), a bottom surface (120) and a plurality of side surfaces that connect the top surface (110) and the bottom surface (120). The top and bottom surfaces (110, 120) face in opposite directions and have a generally triangular shape extending in parallel. The side surfaces (130, 140, 150) are inclined at an obtuse angle with respect to the bottom surface (120) and at an acute angle with respect to the top surface (110). The side surfaces (130, 140) each consist of a first side surface (132, 142) and a second side surface (134, 144). The first side surface (132, 142) consists of a first curved surface (136, 146), which adjoins the top surface (110), and a second planar surface (138, 148) thereunder. Although it is not shown, the side surface (150) also consists of a first side surface and a second side surface similar to the other side surfaces (130, 140).

A main cutting edge (160, 170) is formed at the intersection between the first side surface (132, 142) and the top surface (110). An inclined cutting edge (162, 172) and a minor cutting edge (164, 174) are formed at the intersection between the second side surface (134, 144) and the top surface (110). The main cutting edge (160, 170), the inclined cutting edge (162, 172) and the minor cutting edge (164, 174) are connected in said order to form a continuous cutting edge. The second side surface (134) is connected to a first side surface (142) of the other adjacent side surface (140) via a corner surface (184). A cutting edge is also formed at the corner (182), which is an intersection between the corner surface (184) and the top surface (110). The cutting insert (100) has 120° rotational symmetry about an axis (118) passing through the respective centers of the top and bottom surfaces (110, 120). All the rims of the top surface (110) are provided with cutting edges, and can be used as a cutting edge by changing the mounting location of the cutting insert (100).

The top surface (110) includes a rake surface (114) inwardly extending toward the bottom surface (120) from the cutting edge. The rake surface (114) facilitates the discharge of the chips generated from the cutting edge during the cutting process, and allows the chips to have an imaginary diameter of at least 10 mm when they are discharged. The center of the cutting insert (100) is provided with a mounting hole (116), which passes through the top surface and the bottom surface. A screw is fastened through the mounting hole (116) to secure the cutting insert (100) to a tool body or to a cartridge, although it is not limited thereto. A cutting insert may be mounted to a tool body in various ways.

Figure 7:
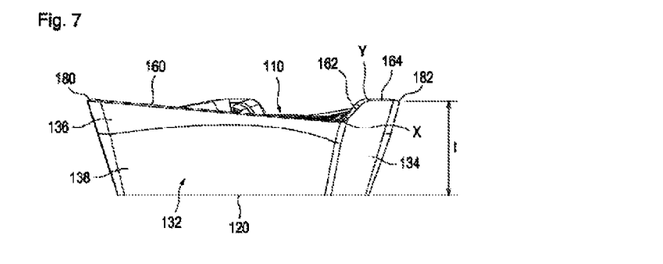
FIG. 7 is a side view of the cutting insert of FIG. 6.

FIG. 7 is a side view of the cutting insert of FIG. 6. As shown in FIG. 7, the main cutting edge (160) slopes downward at an angle of about 3° to 10° as it goes from a corner (180) to another corner (182) on the top surface (110). The inclined cutting edge (162) slopes upward at an angle of about 15° to 50° from a meeting point (X) with the main cutting edge (160) to a meeting point (Y) with the minor cutting edge (164). The minor cutting edge (164) is parallel to the bottom surface (120) from the meeting point (Y) with the inclined cutting edge (162) to the other corner (182) of the top surface (110). However, unlike the illustration, the minor cutting edge (164) may slope upward or downward within an angle of about 10° from the meeting point (Y) with the inclined cutting edge (162) to the other corner (182) of the top surface (110).

Figure 8:
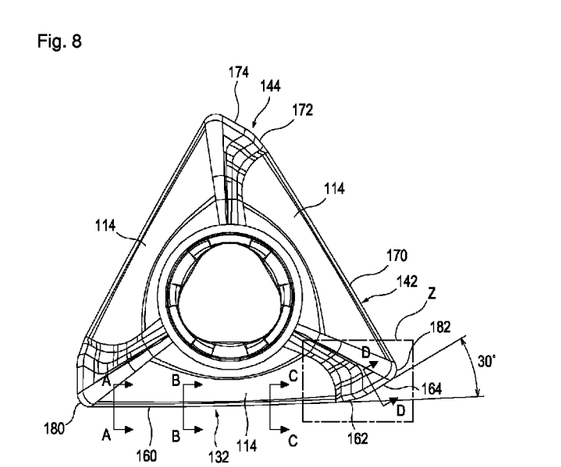
FIG. 8 is a plane view of the cutting insert of FIG. 6.

FIG. 8 is a plane view of the cutting insert of FIG. 6 wherein the cutting insert (100) is viewed from the above. Although the main cutting edge is drawn as a straight line for the sake of convenience, it is in fact outwardly convex with a large radius of curvature. As shown in FIG. 8, when seen from the above, the cutting insert (100) is configured to form an obtuse angle between the first side surface (132, 142) and the second side surface (134, 144). That is, the second side surface (134, 144) has an angle of about 30° with respect to the extension of the first side surface (132, 142). Accordingly, the minor cutting edge (164, 174) formed on the second side surface (134, 144) has an angle of about 30° with respect to the extension of the main cutting edge (160, 170) formed on the first side surface (132, 142). The second side surface (134) is connected to the first side surface (142) of another adjacent side surface (140) at about a right angle via the corner surface (184). Thus, the minor cutting edge (164) formed on the second side surface (134) is connected to the main cutting edge (170) formed on the first side surface (142) of another adjacent side surface (140) at about a right angle via the cutting edge of the corner (182).

Figure 9:
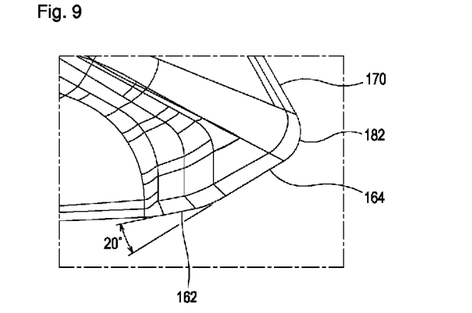
FIG. 9 is an enlarged view of Z shown in FIG. 8.

The second side surface (134) of the cutting insert (100), on which the inclined cutting edge (162) and the minor cutting edge (164) are formed, is inclined at an obtuse angle with respect to the bottom surface (120). The inclined cutting edge (162) slopes upward with respect to the bottom surface (120) from the meeting point (X) with the main cutting edge (160) to the meeting point (Y) with the minor cutting edge (164), whereas the minor cutting edge (164) is parallel to the bottom surface (120). Thus, when the cutting insert (100) is seen from the above as shown in FIG. 9, the inclined cutting edge (162) inwardly goes away from the extension of the minor cutting edge (164) at an angle of about 20°. Further, when the minor cutting edge (164) is not parallel to the bottom surface (120), it may slope with respect to the bottom surface (120) at a smaller angle than the inclined angle of the inclined cutting edge (162) with respect to the bottom surface (120). In such a case, although the angle size may be different, it is same that the inclined cutting edge (162) inwardly goes away from the extension of the minor cutting edge (164) when the cutting insert (100) is seen from the above.

Figure 10:
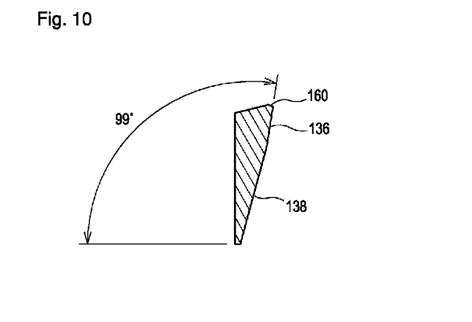
FIG. 10 is a sectional view taken along the line A-A shown in FIG. 8.
Figure 11:
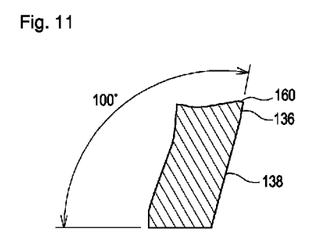
FIG. 11 is a sectional view taken along the line B-B shown in FIG. 8.
Figure 12:
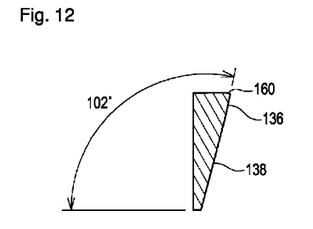
FIG. 12 is a sectional view taken along the line C-C shown in FIG. 8.
Figure 13:
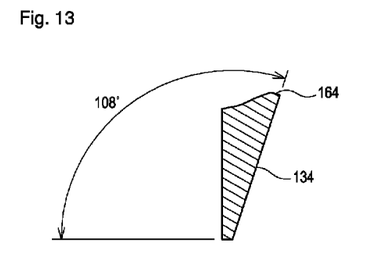
FIG. 13 is a sectional view taken along the line D-D shown in FIG. 8.

FIGS. 10-13 are sectional views each taken along the lines A-A, B-B, C-C and D-D in FIG. 8. As shown in FIGS. 10-12, the first curved surface (136) of the first side surface (132) has an angle of about 99°, 100° and 102° in different cross-sections with respect to the bottom surface (120), respectively. As such, the angle that the first curved surface (136) forms with respect to the bottom surface (120) increases as the main cutting edge (160) goes from the corner (180) of the top surface (110) to the inclined cutting edge (162). Further, the second planar surface (138) forms a constant angle with respect to the bottom surface (120). The cutting insert can be easily and stably secured to the cutter body by using the flat second planar surface (138). As shown in FIG. 13, the second side surface (134) forms an angle of about 108° with respect to the bottom surface (120). As such, the obtuse angle that the second side surface (134) forms relative to the bottom surface (120) is greater than the obtuse angle that the first side surface (132) forms relative to the bottom surface (120).

Next, the advantages of the cutting insert according to the first embodiment of the present invention will be described when it is mounted in the circumferential pocket of the cutting tool and conducts a cutting process.

Figure 14:
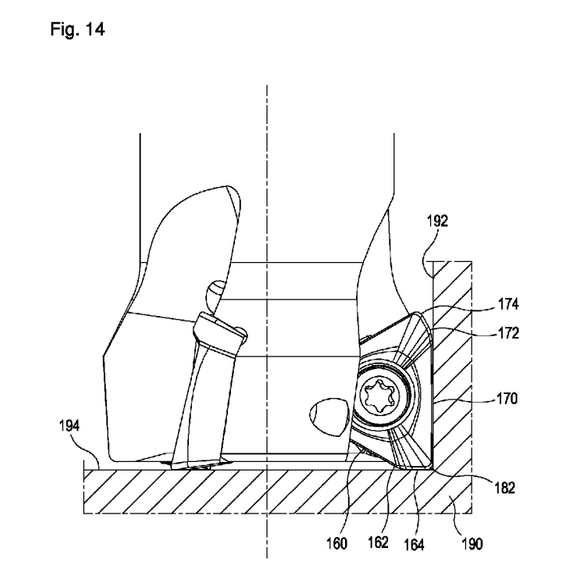
FIG. 14 is a front view of the cutting insert of FIG. 6 while cutting the upright wall and the base wall of the workpiece.

FIG. 14 shows that the cutting insert (100) mounted in a milling cutter conducts the milling of the upright wall (192) and the base wall (194) of the workpiece (190), which are perpendicular to each other. The upright wall (192) is cut by the perpendicularly disposed main cutting edge (170). The base wall (194) is cut by the transversely disposed minor cutting edge (164), which forms a right angle with respect to the main cutting edge (170). The main cutting process is conducted by the main cutting edge (170). The minor cutting edge (164) performs wiping to smoothen the surface of the base wall (194), which is cut by the main cutting edge (170). Further, when the cutting insert (100) is viewed from the above, the main cutting edge (160) is inwardly positioned at an angle of about 30° from the extension of the minor cutting edge (164). Also, the inclined cutting edge (162) is inwardly positioned at an angle of about 20° from the extension of the minor cutting edge (164). Accordingly, the inclined cutting edge (172) and the minor cutting edge (174), which are connected from the upright main cutting edge (170) toward the tool body, are spaced from the upright wall (192). The inclined cutting edge (162) and the main cutting edge (160), which are connected from the transversely disposed minor cutting edge (164) toward the central axis of the cutting tool, are spaced from the base wall (194). Thus, it is certainly prevented that the cutting edges of the cutting insert (100), which are not involved in the cutting process, from coming into contact with the surface of the workpiece. Although the cutting process is performed by the main cutting edge (170) and the minor cutting edge (164) in FIG. 14, the other main cutting edge and the minor cutting edge can perform the same milling process by changing the mounting position of the cutting insert (100).

Further, since the inclined cutting edge (162) of the cutting insert (100) slopes upward from the meeting point (X) with the main cutting edge (160) to the meeting point (Y) with the minor cutting edge (164), the cutting insert (100) has a sufficient thickness (t) in the portion of the minor cutting edge (164) and the corner (182). That is, as shown in FIG. 7, the minor cutting edge (164) is the farthest from the bottom surface (120) and the thickest portion. Thus, it is possible to reinforce the strength of the portion where the greatest cutting resistance is generated and breakage occurs easily since the portion initially contacts a workpiece (190) to start cutting during the milling process.

Generally, the cutting inserts are produced by means of a pressing method in which powder is given a desired shape in a press and is then compressed and sintered. Since the flatness of the surface after the sintering is not adequate, polishing the bottom surface of the cutting insert is required. When the minor cutting edge (164) is parallel to the bottom surface (120) as shown in FIG. 7, the cutting insert (100) can be stably supported by using the minor cutting edge (164) of the top surface (110) as the basis of the process, thereby facilitating the polishing of the bottom surface (120) of the cutting insert.

Figure 15:
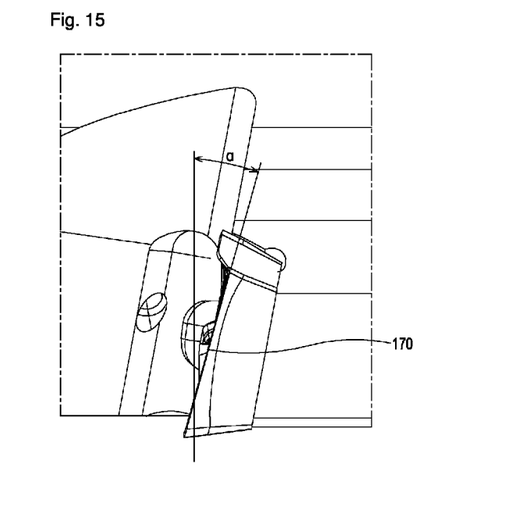
FIG. 15 is a side view of the cutting insert mounted in the cutting tool.
Figure 16:
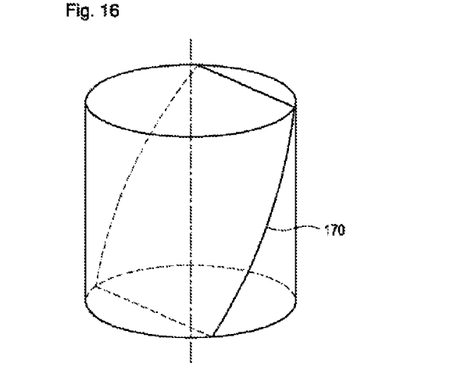
FIG. 16 is a schematic diagram of the length from the rotational axis of the cutting tool to the main cutting edge during a cutting process.

FIG. 15 is a side view of the cutting insert mounted in a cutting tool. The cutting insert (100) is mounted such that the main cutting edge (170) has a positive axial rake angle (α) with respect to the rotational axis of the tool and the minor cutting edge (164) has a negative radial rake angle (not shown) with respect to the line in the radial direction of the tool. Since the main cutting edge (170) of the cutting insert (100) slopes downward from the corner (182) of the top surface (110), this increases the axial rake angle (α) of the main cutting edge (170) without inclining the cutting insert (100) at that extent. In this way, the cutting resistance over the main cutting edge (170) is reduced. The discharge of chips becomes easy. The cutting insert (100) can be securely mounted in the pocket because there is no need to increase the inclined angle of the mounting surface of the pocket, in which the cutting insert (100) is mounted. In addition, the main cutting edge (170) is outwardly convex when the cutting insert (100) is seen from the above. Accordingly, even if the main cutting edge (170) is mounted at a positive axial angle (α) with respect to the rotational axis of the tool as shown in FIG. 16, the length of radius from the rotational axis is constant along the entire length of the main cutting edge (170), thereby improving the cutting performance. Further, an angle which the first curved surface (146) below the main cutting edge (170) forms with the bottom surface (120) increases as the main cutting edge (170) goes from the corner (182) of the top surface to the inclined cutting edge (172). Thus, even if the main cutting edge (170) is mounted at a positive axial angle (α) with respect to the rotational axis of the tool, the clearance angle formed between the first curved surface (146) and the machined surface of a workpiece is constant along the entire length of the main cutting edge (170). As such, the cutting resistance over the cutting edge becomes uniform and the cutting edge wears uniformly, thereby providing an excellent strength and extending service life.

Figure 17:
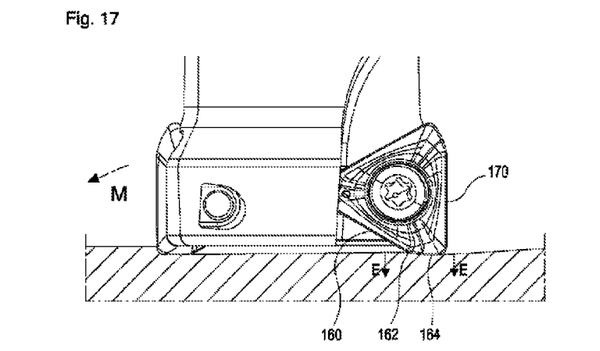
FIG. 17 is a schematic diagram of the cutting insert of FIG. 6 configured to cut the workpiece while moving downwardly and obliquely.
Figure 18:
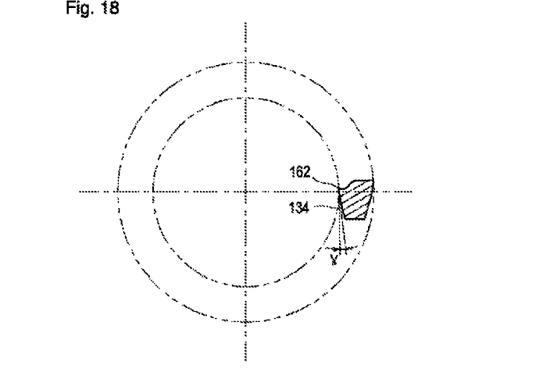
FIG. 18 is a sectional view taken along the line E-E shown in FIG. 17.

FIG. 17 shows a work piece (190) cut by the cutting insert (100). In FIG. 17, the cutting insert (100) moves both in the axial and radial directions of the rotational axis of the tool. The direction of motion is indicated by the arrow labeled M. In other words, the cutting insert (100) moves downward at a predetermined inclined angle. In such a ramp milling, the inclined cutting edge (162) as well as the minor cutting edge (164) contact the bottom surface (194) and perform cutting. If the inclined angle of ramp milling increases, then the main cutting edge (160) may also come into contact with the bottom surface (194) and be involved in cutting. On the other hand, since the main cutting process is performed by the main cutting edge, the side surface below the main cutting edge is generally formed to have a small clearance angle in order to give the main cutting edge enough strength. Thus, it is highly likely that the side surface below the main cutting edge interferes with the bottom surface during the ramp milling as in the prior art. On the contrary, since the cutting insert (100) of the present invention comprises the inclined cutting edge (162) on different side surface from the main cutting edge (160), the second side surface (134), which includes the inclined cutting edge (162) therein, can be formed to have a greater obtuse angle with respect to the bottom surface (120) than the obtuse angle formed by the first side surface (132) including the main cutting edge (160) therein with respect to the bottom surface (120). By allowing the second side surface (134), which includes the inclined cutting edge (162) therein, to have a great obtuse angle relative to the bottom surface (120), the side surface below the inclined cutting edge (162) can be prevented from contacting the bottom surface when the cutting insert is mounted to the tool body and conducts ramp milling. The ramp milling can be conducted by using the inclined cutting edge (162). As shown in FIG. 18, which is a sectional view taken along the line E-E shown in FIG. 17, the second side surface (134) below the inclined cutting edge (162) has a clearance angle (γ) with respect to the machined surface and does not come into contact with the machined surface. As such, the inclined cutting edge (162) is not involved in the cutting during the face milling, but can be effectively used in the ramp milling. Thus, by using the inclined cutting edge (162), the cutting insert (100) of the present invention can easily perform a ramp milling in which the cutting insert is moved in the radial and axial directions at the same time, as well as a face milling in which the cutting insert is moved radially in relation to the rotational axis of the cutting tool.

Figure 19:
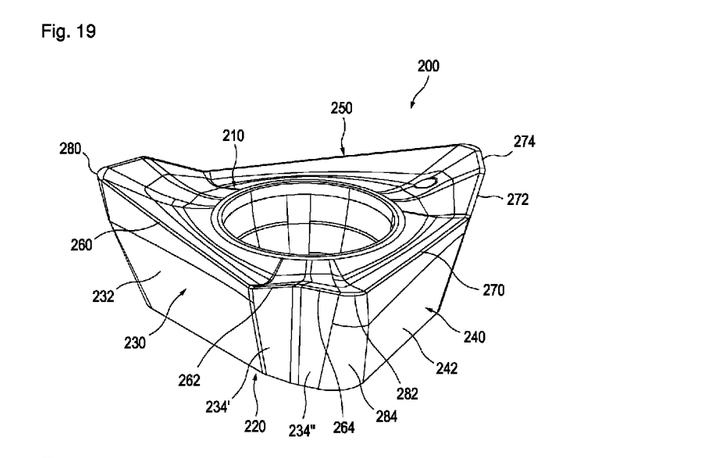
FIG. 19 is a perspective view of a cutting insert according to a second embodiment of the present invention.
Figure 20:
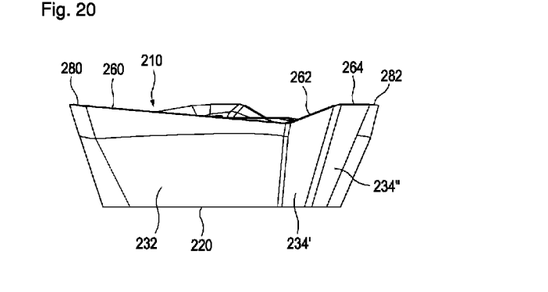
FIG. 20 is a side view of the cutting insert of FIG. 19.
Figure 21:
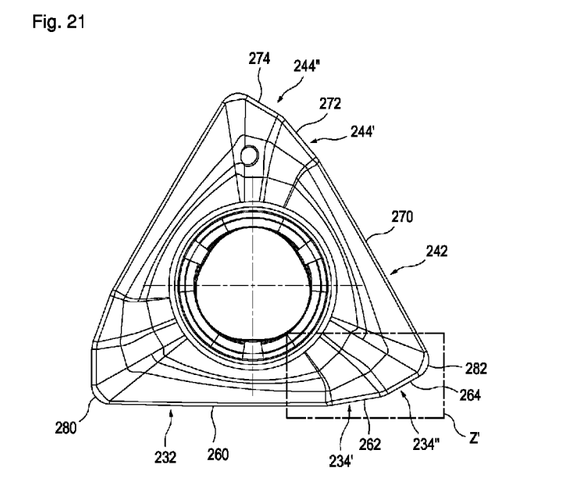
FIG. 21 is a plane view of the cutting insert of FIG. 19.
Figure 22:
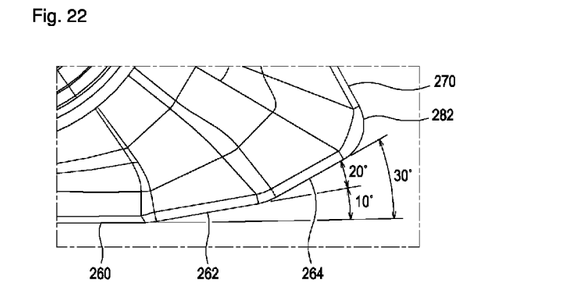
FIG. 22 is an enlarged view of Z' shown in FIG. 21.

Next, the cutting insert according to the second embodiment of the present invention will be explained with reference to FIGS. 19-22. FIG. 19 shows a perspective view of the cutting insert according to the second embodiment of the present invention. FIG. 20 is a side view of the cutting insert shown in FIG. 19. FIG. 21 is a plane view of the cutting insert shown in FIG. 19. FIG. 22 is an enlarged view of the portion marked with Z' in FIG. 21.

The cutting insert (200) according to the second embodiment has basically the same technical constitution as the cutting insert (100) according to the first embodiment. Thus, the explanations on the identical features will be omitted herein, and only the differences between the cutting insert (200) and the cutting insert (100) will be explained. In the cutting insert (100) of the first embodiment, the inclined cutting edge (162) and the minor cutting edge (164) are formed together in the second side surface (134). However, in the cutting insert (200) of the second embodiment, the second side surface (134) is formed as two planar surfaces (234', 234"), and the inclined cutting edge (162) and the minor cutting edge (164) are formed on each different planar surface (234', 234"). Since the inclined angle of the inclined cutting edge (162) with respect to the bottom surface (120) is different from the inclined angle of the minor cutting edge (164) with respect to the bottom surface (120) in the cutting insert (100) according to the first embodiment, the inclined cutting edge (162) inwardly goes away from the extension of the minor cutting edge (164) when the cutting insert (100) is seen from the above. Further, since the side surface (234') having the inclined cutting edge (262) forms an obtuse angle with the side surface (234") having the minor cutting edge (264) in the cutting insert (200) according to the second embodiment, the inclined cutting edge (262) inwardly goes away from the extension of the minor cutting edge (264) when the cutting insert (200) is seen from the above.

Despite such differences, the cutting insert (200) provides the same advantages as the cutting insert (100). When the cutting insert (200) is seen from the above as shown in FIG. 22, the minor cutting edge (264) inwardly extends at an angle of about 30° from the extension of the main cutting edge (260), and the minor cutting edge (264) inwardly extends at an angle of about 20° from the extension of the inclined cutting edge (262). Thus, it is certainly prevented that the cutting edges of the cutting insert (200), which are not involved in the cutting process, from coming into contact with the surface of the workpiece. Further, the inclined cutting edge (262) of the cutting insert (200) slopes upward from the meeting point with the main cutting edge (260) to the meeting point with the minor cutting edge (264). The cutting insert (200) has a sufficient thickness (t) in the portion of the minor cutting edge (264) and the corner (282). Thus, it is possible to reinforce the strength of the portion where the greatest cutting resistance is generated and the breakage occurs easily since the portion initially contacts a workpiece to start cutting during the milling process. Moreover, the cutting insert (200) is configured such that the obtuse angle formed by the side surface (234) having the inclined cutting edge (262) relative to the bottom surface (220) is greater than the obtuse angle formed by the first side surface (232) having the main cutting edge (260) relative to the bottom (220). In this manner, the side surface below the inclined cutting edge (262) is prevented from coming into contact with the bottom surface when the cutting insert is mounted to the tool body and conducts ramp milling. Also, the ramp milling can be conducted by using the inclined cutting edge (262).

Figure 23:
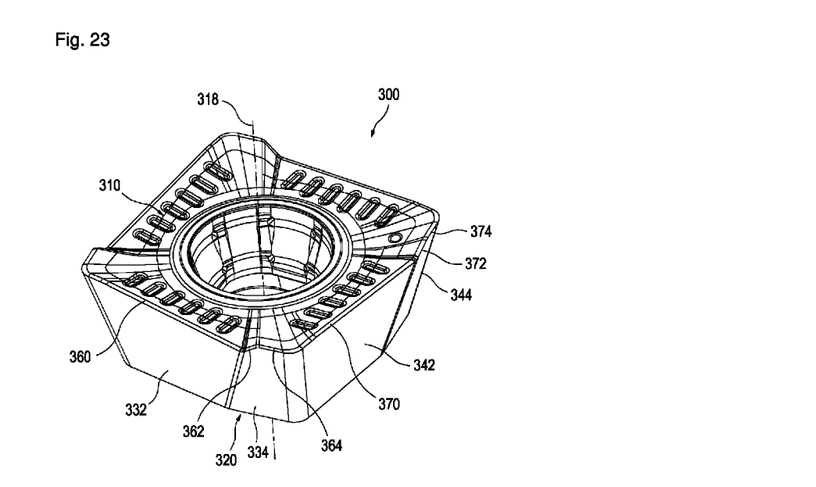
FIG. 23 is a perspective view of a cutting insert according to a third embodiment of the present invention.
Figure 24:
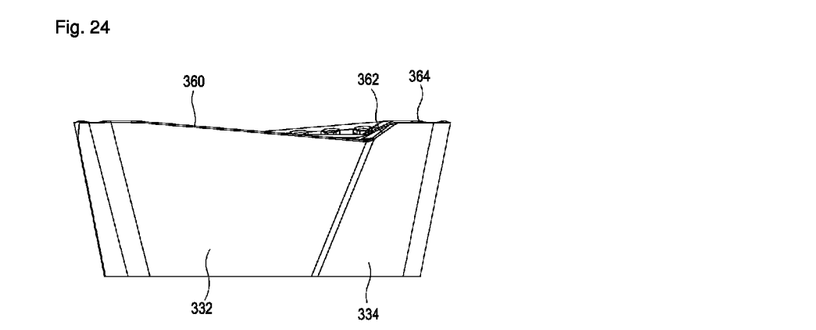
FIG. 24 is a side view of the cutting insert of FIG. 23.
Figure 25:
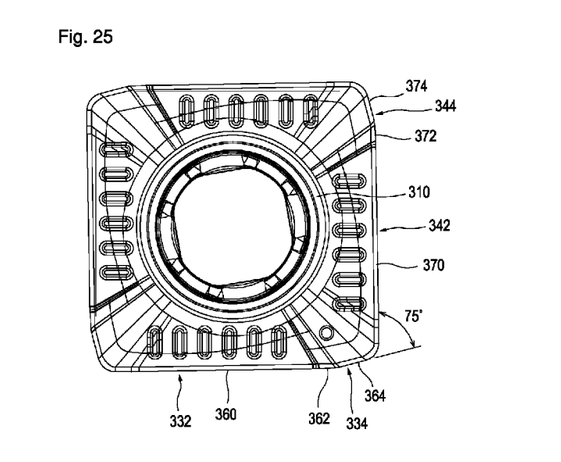
FIG. 25 is a plane view of the cutting insert of FIG. 23.

Next, the cutting insert according to the third embodiment of the present invention will be explained with reference to FIGS. 23-25. FIG. 23 is a perspective view of a cutting insert according to the third embodiment of the present invention. FIG. 24 is a side view of the cutting insert shown in FIG. 23. FIG. 25 is a plane view of the cutting insert shown in FIG. 23. The cutting insert (300) according to the third embodiment has basically the same technical constitution as the cutting insert (100) according to the first embodiment. Thus, the explanations on the identical features will be omitted herein. Only the differences between the cutting insert (300) and the cutting insert (100) will be explained.

In the cutting insert (100) of the first embodiment, the top surface (110) and the bottom surface (120) of a generally triangular shape are 120° rotationally symmetrical around the axis (118), which passes through the centers of the top surface (110) and the bottom surface (120). On the contrary, in the cutting insert (300) of the third embodiment, the top surface (310) and the bottom surface (320) of a generally rectangular shape are 90° rotationally symmetrical around the axis (318), which passes through the centers of the top surface (310) and the bottom surface (320). When the cutting insert (100) is seen from the above, the second side surface (134) is connected to the first side surface (142) of another adjacent side surface (140) at about a right angle. On the contrary, when the cutting insert (300) is seen from the above, the second side surface (334) is connected to the first side surface (342) of another adjacent side surface (340) at an angle of about 105°. The main cutting edge of the cutting insert (100) cuts an upright wall, which is perpendicular to a base wall, whereas the main cutting edge of the cutting insert (300) forms an angle of about 75° with the base wall during the cutting process. Despite such differences, the cutting insert (300) provides the same features in shape and advantages as the cutting insert (100). Likewise, while retaining the features in shape of the cutting insert (200) according to the second embodiment, the shapes of the top surface (210) and the bottom surface (220) can be modified into a rectangular shape.

Although the invention has been described based on its desirable embodiments, it is understood that such detail is solely for the purpose of illustration, and variations can be made therein by those skilled in the art without departing from the spirit and scope of the invention. For example, the cutting insert according to one embodiment of the present invention has cutting edges on every intersection between the top surface and the side surface, but cutting edges can be formed only on some intersections, as necessary. According to the cutting insert of one embodiment of the present invention, a first side surface is formed by a first curved surface and a second planar surface below the first curved surface, but the first side surface can be formed as a single planar surface. Such a modification would be considered obvious to one of ordinary skill in the art and fall within the scope of the present invention.

The invention claimed is:

1. A cutting insert, comprising:
a top surface, a bottom surface and a plurality of side surfaces connecting the top and bottom surfaces and forming an obtuse angle with the bottom surface as well as an acute angle with the top surface,
wherein the side surfaces comprise a first side surface and a second side surface which form an obtuse angle with each other when seen from above,
wherein an intersection between the first side surface and the top surface forms a main cutting edge, and wherein an intersection between the second side surface and the top surface forms both an inclined cutting edge only for ramp milling and a minor cutting edge, and wherein an obtuse angle which the second side surface forms with the bottom surface is greater than that which the first side surface forms with the bottom surface.

2. The cutting insert according to claim 1,
wherein the main cutting edge slopes downward toward the bottom surface from a corner of the top surface,
wherein the inclined cutting edge slopes upward away from the bottom surface from a meeting point with the main cutting edge to a meeting point with the minor cutting edge,
wherein the minor cutting edge slopes from the meeting point with the inclined cutting edge to another corner of the top surface, and
wherein an angle which the minor cutting edge slopes with respect to the bottom surface is smaller than that which the inclined cutting edge slopes with respect to the bottom surface.

3. The cutting insert according to claim 1,
wherein the second side surface comprises a first plane surface and a second plane surface which form an obtuse angle with each other when seen from above,
wherein the inclined cutting edge is formed at an intersection between the first plane surface and the top surface, and
wherein the minor cutting edge is formed at an intersection between the second plane surface and the top surface.

4. The cutting insert according to claim 3,
wherein the main cutting edge slopes downward toward the bottom surface from a corner of the top surface, and
wherein the inclined cutting edge slopes upward away from the bottom surface from a meeting point with the main cutting edge to a meeting point with the minor cutting edge.

5. The cutting insert according to claim 4,
wherein an angle which the first side surface forms with the bottom surface increases along the main cutting edge from the corner of the top surface to a meeting point with the inclined cutting edge.

6. The cutting insert according to claim 4,
wherein the first side surface comprises a first curved surface which intersects the main cutting edge and a second plane surface below the first curved surface, and wherein an angle which the first curved surface forms with the bottom surface increases along the main cutting edge from the corner of the top surface to a meeting point with the inclined cutting edge.

7. The cutting insert according to claim 4,
wherein the top and bottom surfaces are formed in a triangle, and
wherein adjacent side surfaces forms a right angle with each other via a corner surface when seen from above.

8. The cutting insert according to claim 4,
wherein the top and bottom surfaces are formed in a rectangle, and
wherein adjacent side surfaces form an obtuse angle with each other via a corner surface when seen from above.

9. The cutting insert according to claim 3,
wherein an angle which the first side surface forms with the bottom surface increases along the main cutting edge from the corner of the top surface to a meeting point with the inclined cutting edge.

10. The cutting insert according to claim 3,
wherein the first side surface comprises a first curved surface which intersects the main cutting edge and a second plane surface below the first curved surface, and
wherein an angle which the first curved surface forms with the bottom surface increases along the main cutting edge from the corner of the top surface to a meeting point with the inclined cutting edge.

11. The cutting insert according to claim 3,
wherein the top and bottom surfaces are formed in a triangle, and
wherein adjacent side surfaces forms a right angle with each other via a corner surface when seen from above.

12. The cutting insert according to claim 3,
wherein the top and bottom surfaces are formed in a rectangle, and
wherein adjacent side surfaces form an obtuse angle with each other via a corner surface when seen from above.

13. The cutting insert according to claim 2,
wherein an angle which the first side surface forms with the bottom surface increases along the main cutting edge from the corner of the top surface to a meeting point with the inclined cutting edge.

14. The cutting insert according to claim 2,
wherein the first side surface comprises a first curved surface which intersects the main cutting edge and a second plane surface below the first curved surface, and
wherein an angle which the first curved surface forms with the bottom surface increases along the main cutting edge from the corner of the top surface to a meeting point with the inclined cutting edge.

15. The cutting insert according to claim 2,
wherein the top and bottom surfaces are formed in a triangle, and
wherein adjacent side surfaces forms a right angle with each other via a corner surface when seen from above.

16. The cutting insert according to claim 2,
wherein the top and bottom surfaces are formed in a rectangle, and
wherein adjacent side surfaces form an obtuse angle with each other via a corner surface when seen from above.

17. The cutting insert according to claim 1,
wherein the top and bottom surfaces are formed in a rectangle,
wherein adjacent side surfaces form an obtuse angle of 105° with each other via a corner surface when seen from above.

18. The cutting insert according to claim 2,
wherein the top and bottom surfaces are formed in a rectangle,
wherein adjacent side surfaces form an obtuse angle of 105° with each other via a corner surface when seen from above.

19. The cutting insert according to claim 3,
wherein the top and bottom surfaces are formed in a rectangle,
wherein adjacent side surfaces form an obtuse angle of 105° with each other via a corner surface when seen from above.

20. The cutting insert according to claim 4,
wherein the top and bottom surfaces are formed in a rectangle,
wherein adjacent side surfaces form an obtuse angle of 105° with each other via a corner surface when seen from above.

21. The cutting insert according to claim 1,
wherein the cutting insert is rotation symmetric, and
wherein the minor cutting edge formed on the second side surface is connected to the main cutting edge formed on the first side surface of another adjacent side surface at about a right angle via a corner cutting edge.

22. The cutting insert according to claim 1, wherein, in a plane view of the cutting insert viewed from above:
the inclined cutting edge is inwardly recessed relative to an extension of the main cutting edge, and forms a first acute angle with respect thereto; and
the minor cutting edge is inwardly recessed relative to the extension of the main cutting edge, and forms a second acute angle with respect thereto, the second acute angle being larger than the first acute angle.

23. The cutting insert according to claim 1, wherein, in a plane view of the cutting insert viewed from above:
the inclined cutting edge is inwardly recessed relative to an extension of the minor cutting edge, and forms a first acute angle with respect thereto of about 20 degrees.

* * * * *